US006876348B2

(12) United States Patent
Murata et al.

(10) Patent No.: US 6,876,348 B2
(45) Date of Patent: Apr. 5, 2005

(54) DISPLAY DEVICE EQUIPPED WITH SRAM IN PIXEL AND DRIVING METHOD OF THE SAME

(75) Inventors: Hiroyoshi Murata, Saitama-ken (JP); Nobuo Yamasaki, Saitama-ken (JP); Masakatsu Kitani, Saitama-ken (JP); Yoshihiro Aoki, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 313 days.

(21) Appl. No.: 10/033,919

(22) Filed: Jan. 3, 2002

(65) Prior Publication Data

US 2002/0089471 A1 Jul. 11, 2002

(30) Foreign Application Priority Data

Jan. 10, 2001 (JP) .................................... P2001-002631

(51) Int. Cl.[7] .................................................. C09G 3/36

(52) U.S. Cl. ........................... 345/90; 345/98; 345/205; 345/690

(58) Field of Search ............................. 345/98, 90, 89, 345/92, 87, 55, 204, 205, 690

(56) References Cited

U.S. PATENT DOCUMENTS 5,712,652 A * 1/1998 Sato et al. .................... 345/90
5,945,972 A * 8/1999 Okumura et al. ............. 345/98
6,140,983 A * 10/2000 Quanrud ...................... 345/55
6,278,428 B1 * 8/2001 Smith et al. .................. 345/92
6,339,417 B1 * 1/2002 Quanrud ...................... 345/98
6,618,030 B2 * 9/2003 Kane et al. ................... 345/82
6,636,194 B2 * 10/2003 Ishii ............................ 345/98
2002/0089481 A1 * 7/2002 Tsutsui et al. ................ 345/92

FOREIGN PATENT DOCUMENTS

JP 2001-264814 9/2001

* cited by examiner

*Primary Examiner*—Guy J. Lamarre
*Assistant Examiner*—Fritz Alphonse
(74) *Attorney, Agent, or Firm*—Oblon, Spivak, McClelland, Maier & Neustadt, P.C.

(57) ABSTRACT

With regard to a display device having an SRAM incorporated in a pixel, a technology is disclosed, which is capable of reducing manufacturing costs by simplifying a constitution of a driver. A write voltage equivalent to white or black represented by a tone level of a normal display area is converted into a write voltage corresponding to a brightest white display or a darkest black display in the pixel, and is held in the SRAM of each pixel. In the case of normal display, display is carried out with the write voltage represented by the tone level of the normal display area. In the case of static image display, display is carried out with the write voltage corresponding to the brightest white display or the darkest black display in the pixel, the write voltage being held in the SRAM. Since the normal display and the static image display can be carried out with a write voltage supplied from one driver, the constitution of the driver can be simplified.

17 Claims, 8 Drawing Sheets

DISPLAY DEVICE EQUIPPED WITH SRAM IN PIXEL AND DRIVING METHOD OF THE SAME

CROSS-REFERENCE TO RELATED APPLICATIONS

This application is based upon and claims the benefit of priority under 35USC § 119 to Japanese Patent Application No. 2001-2631, filed Jan. 10, 2000; the entire contents of which are incorporated herein by reference.

BACKGROUND OF THE INVENTION

1. Field of the Invention

The present invention relates to a display device having an SRAM in a pixel. More specifically, the invention relates to a circuit technology for driving the SRAM.

2. Description of the Related Art

A liquid crystal display device has been developed, which includes a memory element capable of holding video data statically. U.S. Pat. No. 5,712,652 discloses one of basic principles with regard to such a liquid crystal display device. The liquid crystal display device disclosed in U.S. Pat. No. 5,712,652 includes a memory cell in a pixel, and carries out static image display by using binary video data held in the memory cell, accordingly reducing power consumption in the static image display.

In recent years, halftone display or moving image display (referred to as normal display, hereinafter) has been carried out even on the small screen of a cellular telephones. For such form of use, there has been a request made to carry out the static image display at lower power consumption at the time of waiting, and to carry out the normal display by full color at the time of calling. In the case of the liquid crystal display device disclosed in U.S. Pat. No. 5,712,652, however, some improvements must be made to suit such a form of use, as only the static image is targeted to be displayed based on the binary video data.

Now, description will be made for an exemplary constitution, which enables switching between the normal display and the static image display based on the liquid crystal display device of the conventional example disclosed in U.S. Pat. No. 5,712,652.

Hereinafter, video data for black and white display, which is used for the static image display, will be referred to as binary data. Thus, simply written “video data” means full color video data used for normal display.

Each of FIG. 1 and FIG. 2 shows circuitry of one pixel among a plurality of pixels disposed in a matrix form. A pixel 1 includes a pixel portion 4 as a liquid crystal pixel, and an SRAM portion 5 capable of holding binary data.

In the circuitry shown in FIG. 1, video data outputted from a not-shown source driver is supplied through a signal line 3 to the pixel portion 4. Similarly, binary data outputted from a not-shown SRAM driver is supplied through an SRAM writing line 2 to the SRAM portion 5. In this example, the SRAM writing line 2 and the signal line 3 are individually necessary, and the two drivers, i.e., the SRAM driver and the source driver, are also necessary. In FIG. 1 (also in FIG. 2), a reference numeral 6 denotes a scanning line for transmitting a scanning signal outputted from a not-shown gate driver; and a reference numeral 7 denotes an SRAM control line for transmitting a control signal outputted from a not-shown system control circuit.

In another circuitry shown in FIG. 2, two drivers share the signal line 3, and outputs of the drivers are selected by switches 8 and 9. Specifically, in the normal display, the switch 8 is turned on while the switch 9 is turned off, and the output of the not-shown source driver is supplied through the signal line 3 to the pixel portion 4. In the static image display, the switch 8 is turned off while the switch 9 is turned on, and the output of the not-shown SRAM driver is supplied through the signal line 3 and the pixel portion 4 to the SRAM portion 5. In this example, the SRAM writing line 2 shown in FIG. 1 is made unnecessary, but the two drivers, i.e., the SRAM driver and the source driver, are still necessary.

As described above, in the case of the constitution, which enables switching between the normal display and the static image display based on the liquid crystal display device of the conventional example, the SRAM driver is necessary in addition to the source driver. Consequently, the difficulty of reducing manufacturing costs has been inherent.

BRIEF SUMMARY OF THE INVENTION

An object of the present invention is to achieve a reduction in manufacturing costs by simplifying the constitution of a driver in a display device with an SRAM incorporated in a pixel.

In accordance with a first aspect of the invention, a display device is provided, including a display panel having a plurality of pixels formed. Each of the pixels includes a pixel portion for executing display in accordance with a write voltage, and a data memory portion for converting a write voltage equivalent to white or black represented by a tone level of a normal display area into a write voltage corresponding to a brightest white display or a darkest black display in the pixel portion, and holding the converted write voltage. In this case, normal display is carried out with the write voltage represented by the tone level of the normal display area, and static image display is carried out with the write voltage, which is held in the data memory portion and corresponds to the brightest white display or the darkest black display in the image portion.

In accordance with a second aspect of the invention, a display device is provided, including a display panel having a plurality of pixels formed. Each of the pixels includes a pixel portion for executing display in accordance with a tone level of a write voltage, a data conversion unit for selecting a write voltage represented by a tone level of a normal display area based on a threshold voltage, and converting the selected write voltage into a write voltage corresponding to a brightest white display or a darkest black display in the pixel portion, and a data memory portion for holding the write voltage converted by the data conversion unit. In this case, normal display is carried out with the write voltage represented by the tone level of the normal display area, and static image display is carried out with the write voltage, which is held in the data memory portion and corresponds to the brightest white display or the darkest black display in the image portion.

DETAILED DESCRIPTION OF THE INVENTION

Next, description will be made for a display device and a driving method thereof according to the present invention with reference to embodiments applied to an active matrix liquid crystal display device and a driving method thereof.

First Embodiment

Figure 3:
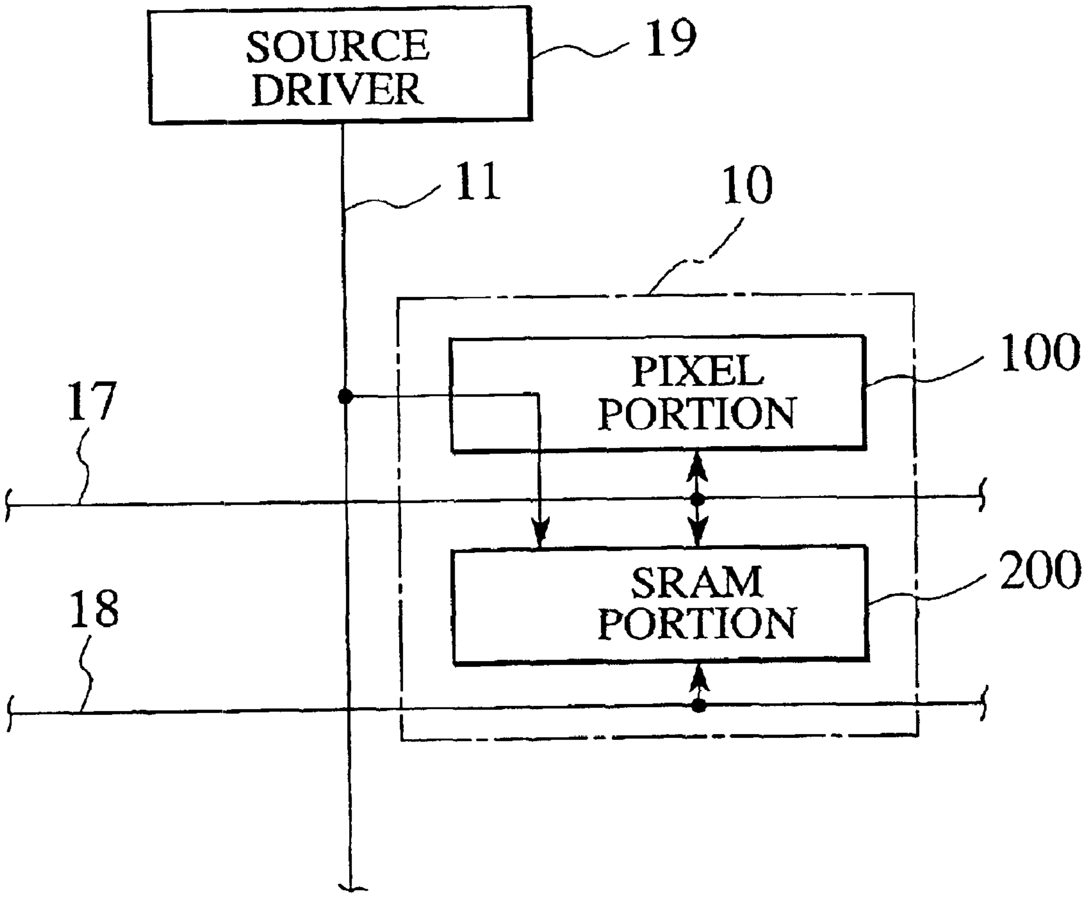
FIG. 3 is a view showing a circuitry in one pixel of a liquid crystal display device according to a first embodiment.

FIG. 3 shows a circuitry in one pixel of a liquid crystal display device according to the first embodiment. A pixel 10 shown in FIG. 3 includes a pixel portion 100 for executing display in accordance with a write voltage, and an SRAM portion 200 capable of holding binary data. Video data outputted from a source driver 19 is supplied through a signal line 11 to the pixel portion 100 and the SRAM portion 200. Reference numerals 17 and 18 denote a scanning line and an SRAM control line similar to those described above, respectively.

Though not shown in the drawing, pluralities of signal lines 11 and scanning lines 17 are present and disposed in a matrix form. The pixel 10 shown in FIG. 3 is disposed for each lattice of the matrix.

Figure 4:
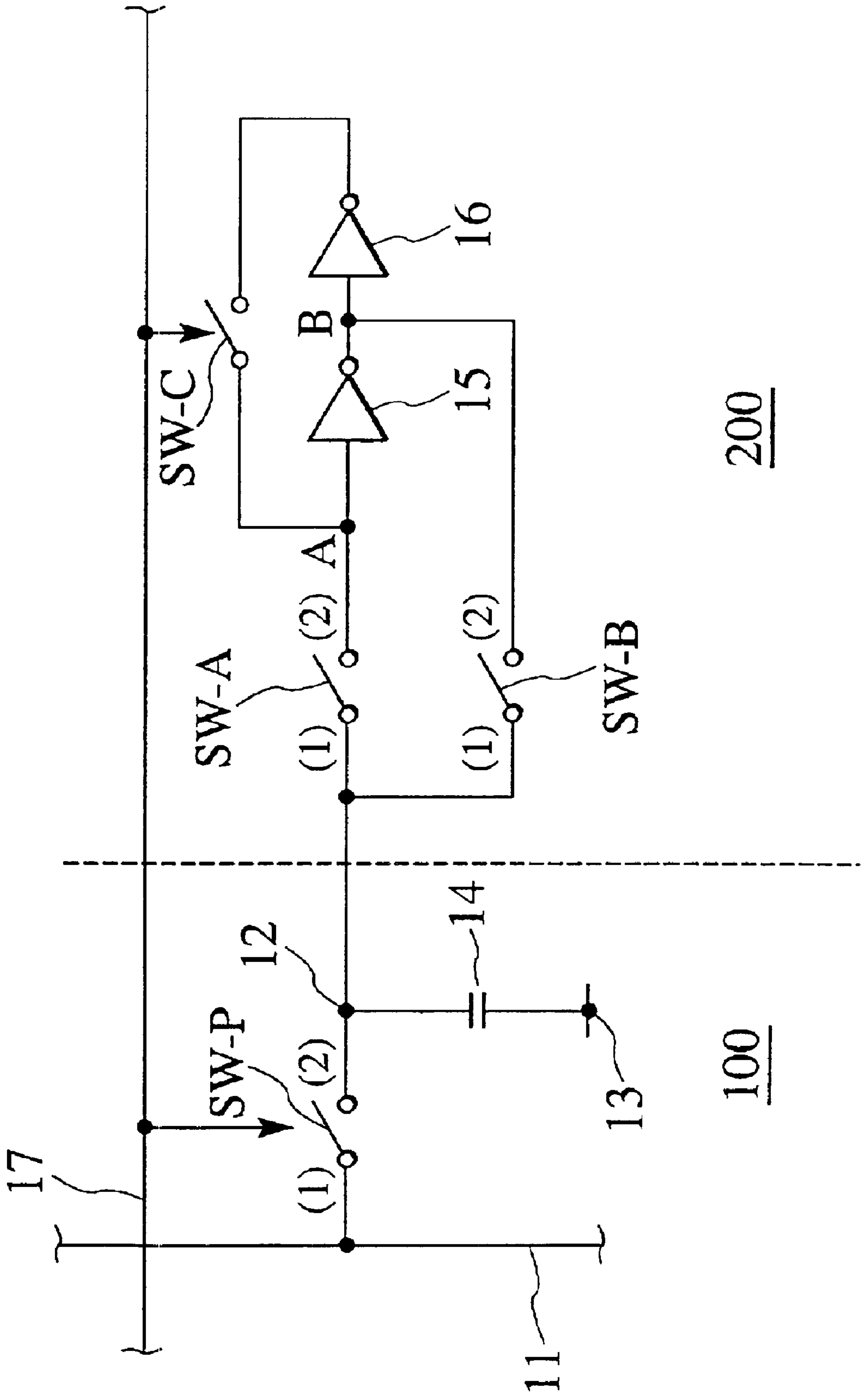
FIG. 4 is a view showing a specific circuitry of a pixel portion and an SRAM portion shown in FIG. 3.

FIG. 4 shows the specific circuitry of the pixel portion 100 and the SRAM portion 200 shown in FIG. 3. A switch symbol in FIG. 4 represents a thin film transistor (TFT) switch such as MOSFET (n or p channel).

The pixel portion 100 includes a switch SW-P, a pixel electrode 12, a counter electrode 13, and a liquid crystal layer 14. The switch SW-P is a pixel switching element in the embodiment, which is controlled to be turned on/off by a high or low scanning signal supplied to the scanning line 17.

A terminal (1) of the switch SW-P is connected to the signal line 11; and a terminal (2) thereof is connected to the pixel electrode 12, a terminal (1) of a switch SW-A, and a terminal (1) of a switch SW-B. The liquid crystal layer 14 is held between the pixel electrode 12 and the counter electrode 13, forming a liquid crystal capacitance Clc. The pixel electrode 12, the counter electrode 13, and the liquid crystal layer 14 constitute a liquid crystal pixel.

In the pixel portion 100, video data outputted from the source driver 19 and binary data outputted from the SRAM portion 200 are set as write voltages, and display is executed in accordance with the write voltages.

The SRAM portion 200 is a data memory portion designed to convert white or black video data represented by a tone level of a normal display area into binary data corresponding to a brightest white display or a darkest black display in the pixel portion 100, and hold the binary data. The SRAM portion 200 includes a switch SW-A, a switch SW-B, a switch SW-C, and inverters 15 and 16 connected to each other in a loop form.

A terminal (2) of the switch SW-A is connected to the input side of the inverter 15, and the output side of the inverter 15 is connected to the input side of the inverter 16 and a terminal (2) of the switch SW-B. The output side of the inverter 16 is connected through the switch SW-C to the input side of the inverter 15. The switches SW-A and SW-B are switching elements for taking out data to control electrical connection between the pixel portion 100 and the SRAM portion 200. The switch SW-C is a switching element for holding data to control electrical connection of the loop connection.

The inverters 15 and 16 are individually composed of CMOS circuits. According to the described embodiment, a high power supply voltage of 10 V and a low power supply voltage of 5 V are supplied to each of the inverters.

The switches SW-A and SW-B are connected to the SRAM control line 18 of FIG. 3, and simultaneously controlled to be turned on/off by a high or low SRAM control signal supplied to the SRAM control line 18. However, there is a reverse relation between the switches SW-A and SW-B with regard to turning on/off. Specifically, when the switch SW-A is turned on, the switch SW-B is turned off. When the switch SW-A is turned off, the switch SW-B is turned on. The switch SW-C is connected to the scanning line 17 shared with a switch SW-P, and controlled to be turned on/off simultaneously with the switch SW-P by a high or low scanning signal supplied to the scanning line 17. However, there is a reverse relation between the switches SW-C and SW-P with regard to turning on/off. Specifically, when the switch SW-P is turned on, the switch SW-C is turned off. When the switch SW-P is turned off, the switch SW-C is turned on.

The above-described pixel 10, signal line 11 and scanning line 17 are formed on a not-shown array substrate. The counter electrode 13 common to all of the pixel electrodes 12 is formed on the full surface of a not-shown counter substrate. Both substrates are disposed with a predetermined gap interposed therebetween, and the liquid crystal layer 14 is held as a display layer between the two substrates. The substrates are sealed with a sealing material on the periphery thereof, and assembled as a display panel.

Next, description will be made for the operations of the pixel portion 100 and the SRAM portion 200 constructed in the foregoing manner. Now, two display forms of the pixel portion 100 are defined: normal driving where full-color halftone display or moving image display is carried out based on video data supplied to the signal line 11; and SRAM driving where static image display is carried out based on binary data held in the SRAM portion 200.

Figure 5:
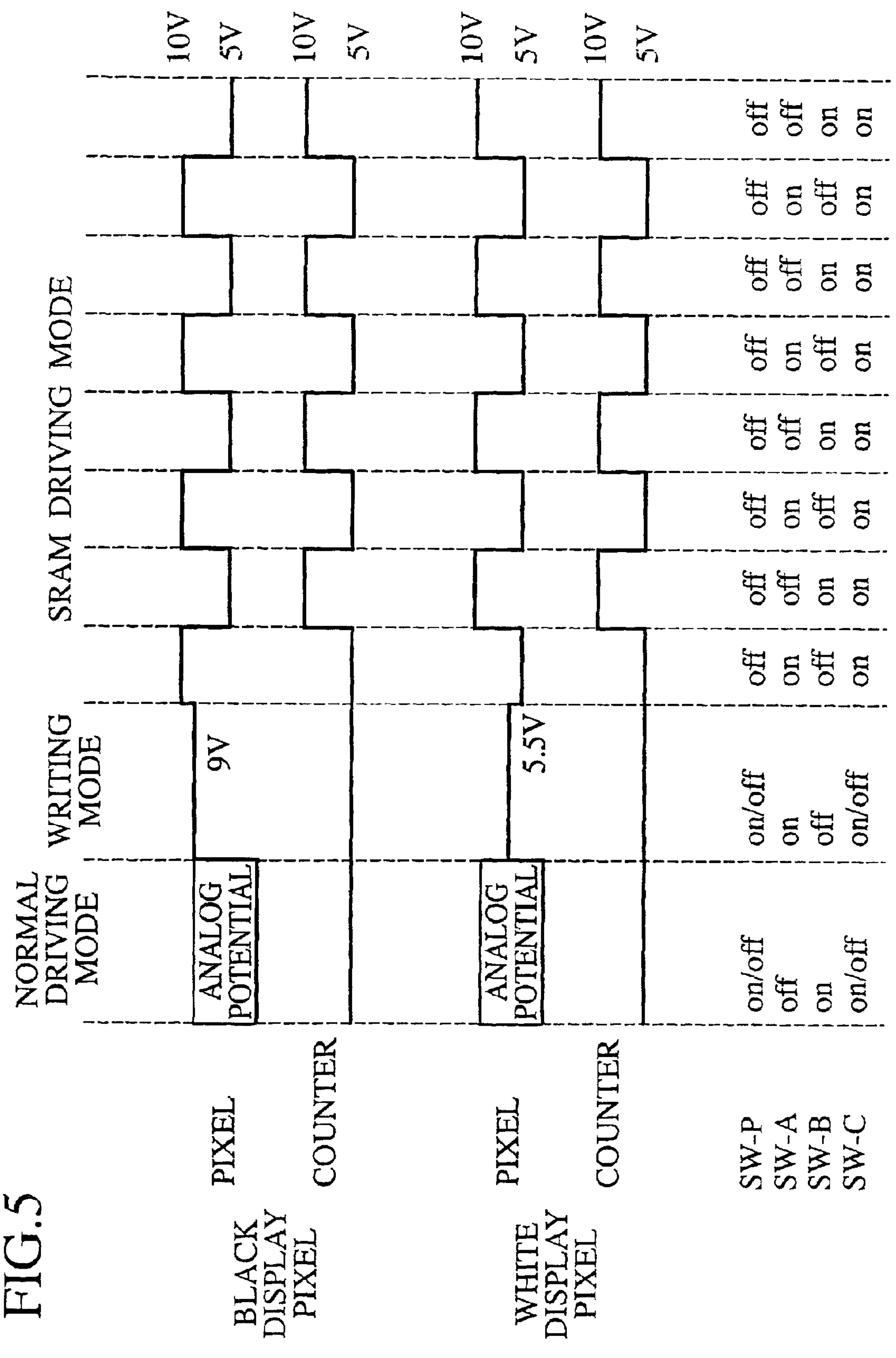
FIG. 5 is a time chart showing changes in signal voltages at the time of normal driving and the SRAM driving.

FIG. 5 is a time chart showing operations at the time of normal driving and at the time of SRAM driving. FIG. 5 specifically shows a relation among the turning on/off of the switches SW-P, SW-A, SW-B, and SW-C and a signal voltage written in the pixel. In the drawing, "black display pixel" and "white display pixel" indicate the pixels of black and white displays on the SRAM driving mode, respectively. However, in each of these pixels, multi-tone display is carried out on the normal driving mode. "Pixel" indicates a signal voltage for video data or binary data written in the pixel electrode 12; "counter" indicates a counter electrode voltage supplied to the counter electrode 13. A broken line indicates a frame division.

In the first embodiment, horizontal line reversal driving is carried out at the time of normal driving. This horizontal line reversal driving is one of the methods employed to AC-drive a liquid crystal. By this driving method, polarities of signal voltages to be written in pixels on one horizontal line are set opposed to those in pixels on the adjacent horizontal line thereto, and the polarities of the signal voltages are reversed for each frame. At the time of SRAM driving, frame reversal driving is carried out. The frame reversal driving is also one of the methods employed to AC-drive a liquid crystal. By this driving method, the polarities of signal voltages to be written in all the pixels are reversed for each frame. "One horizontal line" indicates a pixel array in which pixels are disposed along a scanning line in a horizontal direction. "Pixel on a horizontal line" indicates a pixel constituting the pixel array.

The video data supplied on the normal driving mode is a write voltage represented by a tone level of a normal display area. The video data in the embodiment is analog multi-tone data varying between 9 V and 5.5 V as tone levels of the normal display area, and represented as "analog potential" in FIG. 5. In the embodiment, a write voltage equivalent to black represented by the tone level of the normal display area is 9 V, and a write voltage equivalent to white is 5.5 V.

On the other hand, a signal voltage held as binary data is either a high power supply voltage of 10 V or a low power supply voltage of 5 V in the embodiment. The high power supply voltage of 10 V is a write voltage corresponding to a darkest black display in the pixel portion 100, while the low power supply voltage of 5 V is a write voltage corresponding to a brightest white display in the pixel portion 100. In addition, to AC-drive the liquid crystal pixel at the time of SRAM driving, 10 V or 5 V is supplied as a counter electrode voltage.

On the normal driving mode, the switches SW-A and SW-B are turned off to electrically disconnect the pixel portion 100 and the SRAM portion 200 from each other. Then, the switch SW-P is turned on at a predetermined cycle by a scanning signal supplied from the not-shown gate driver to the scanning line 17 to electrically connect the signal line 11 and the pixel electrode 12 with each other, and video data supplied from the source driver 19 to the signal line 11 is applied to the pixel electrode 12. The switch SW-C is turned on/off in matching with the on/off cycle of the switch SW-P. However, since the pixel portion 100 and the SRAM portion 200 are separated from each other at the time of normal driving, the turning on/off of the switch SW-C does not affect on display. In a circuitry of independently controlling turning on/off of the switch SW-C, the switch SW-C is turned off on the normal driving mode.

Subsequently, the process moves from the normal driving mode to the SRAM driving mode by way of a writing mode (one frame). On the writing mode, the switch SW-A is turned on, while the switch SW-B is turned off. The switches SW-P and SW-C are turned on/off at a predetermined cycle. Then, by considering an input voltage threshold value of the inverter 15, a voltage (9 V) equivalent to black or a voltage (5.5 V) equivalent to white at the tone level of the normal display area is supplied as video data from the source driver 19. Here, it is assumed that 9 V satisfies a threshold value in the high power supply voltage side of the inverter 15, and 5.5 V satisfies a threshold value in the low power supply voltage side of the inverter 15. Accordingly, when the video data of 9 V is supplied to the inverter 15, 10 V of the high power supply voltage is held in the SRAM portion 200 as binary data corresponding to a darkest black display in the pixel portion 100. On the other hand, when the video data of 5.5 V is supplied to the inverter 15, 5 V of the low power supply voltage is held in the SRAM portion 200 as binary data corresponding to a brightest white display in the pixel portion 100.

The above-described video data of 9 V or 5 V can be generated by a not-shown system control circuit for supplying video data to the source driver 19. Specifically, the system control circuit includes a controller IC, a digital-to-analog (D/A) converter, and a timing controller. In the timing controller located before the D/A converter, a digital value of the video data is forcibly converted into 9 V or 5.5 V in accordance with black or white, thus realizing the generation of the video data of 9 V or 5.5V.

Then, on the SRAM driving mode following the writing mode, the switches SW-P and SW-C are fixed at off and on, respectively. In addition, the switches SW-A and SW-B are alternately turned on for each frame to output binary data from a node A or B. For example, in a frame where the switches SW-A and SW-B are turned on and off, respectively, binary data having a polarity reversed by the inverter 16 is outputted from the node A through the switch SW-A to the pixel electrode. In a frame where the switches SW-A and SW-B are turned off and on, respectively, binary data having a polarity reversed by the inverter 15 is outputted from the node B through the switch SW-B to the pixel electrode. By repeating such operations alternately for each frame, each time binary data is outputted from the SRAM portion 200, binary data having a polarity reversed from a polarity of binary data outputted in the previous frame is written in the pixel electrode 12. By reversing the polarity of the counter electrode voltage in accordance with the cycle of such one frame as shown in FIG. 5, binary display by black and white can be carried out by AC driving.

According to the first embodiment, by writing the voltage (9 V) equivalent to black by the tone level of the normal display area or the voltage (5.5 V) equivalent to white into the SRAM portion 200, it is possible to make the SRAM portion 200 to hold the binary data of 10 V equivalent to the darkest black display or 5 V equivalent to the brightest white in the pixel portion 100. Thus, it is possible to eliminate the necessity of an SRAM driver for supplying the binary data of 5 V and 10 V different from driving voltages at the time of normal driving.

Figure 1:
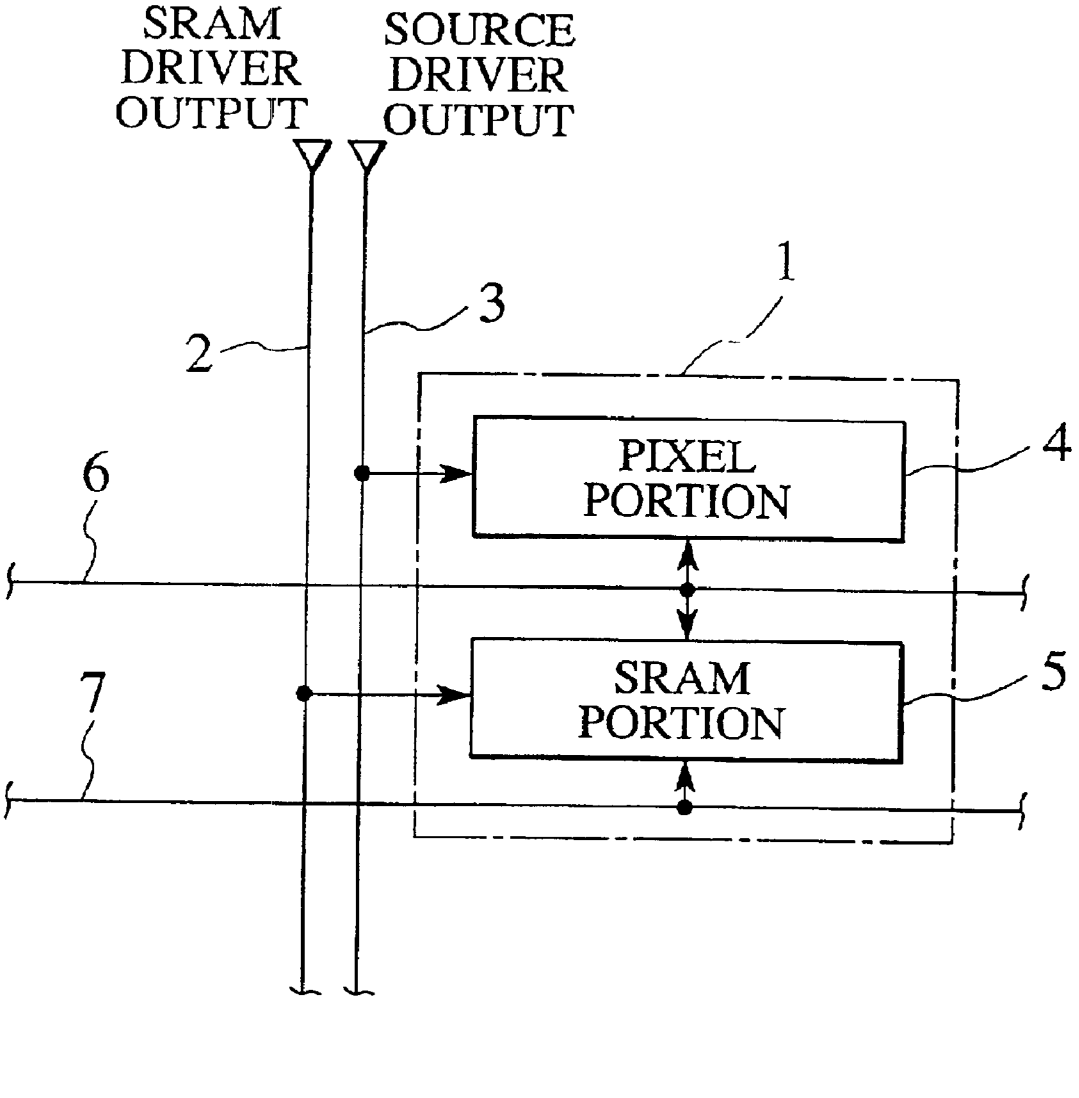
FIG. 1 is a view showing a circuitry adapted to enable switching to be made between normal display and static image display based on a conventional example.
Figure 2:
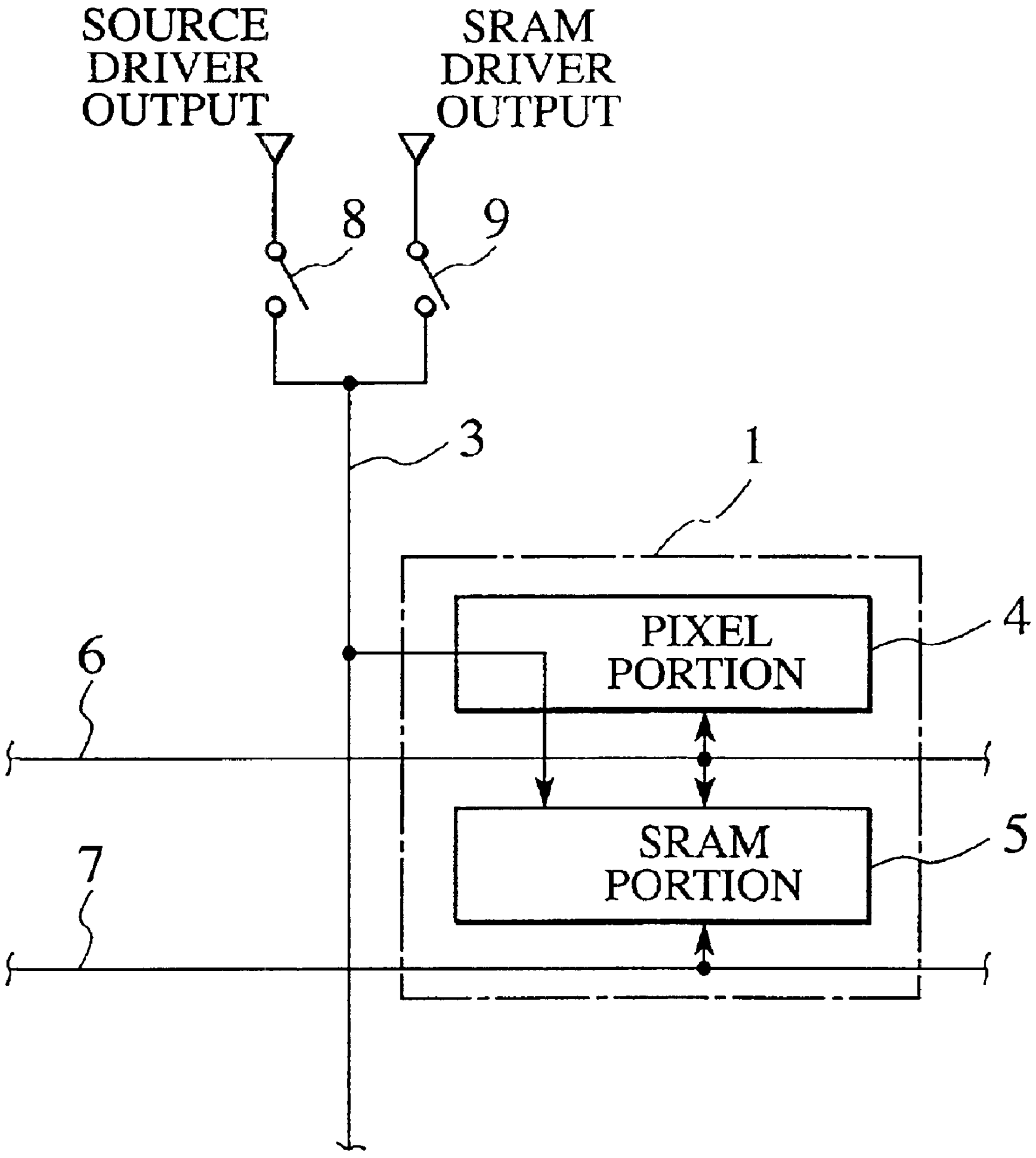
FIG. 2 is a view showing another circuitry adapted to enable switching to be made between the normal display and the static image display based on the conventional example.

In other words, by use of the source driver 19 for outputting the video data represented by the tone level of the normal display area, the binary data corresponding to the darkest black display in the pixel portion 100 or the brightest white display can be written in the SRAM portion 200. Thus, not only the SRAM driver but also the SRAM writing line 2 of FIG. 1 and the switches 8 and 9 of FIG. 2 can be omitted. As a result, it is possible to reduce manufacturing costs and enhance yield by greatly simplifying the constitution of the driver for driving the pixel portion 100 and the SRAM portion 200. Moreover, higher definition and narrower frames can be achieved by suppressing increase in a circuit size.

Second Embodiment

Figure 6:
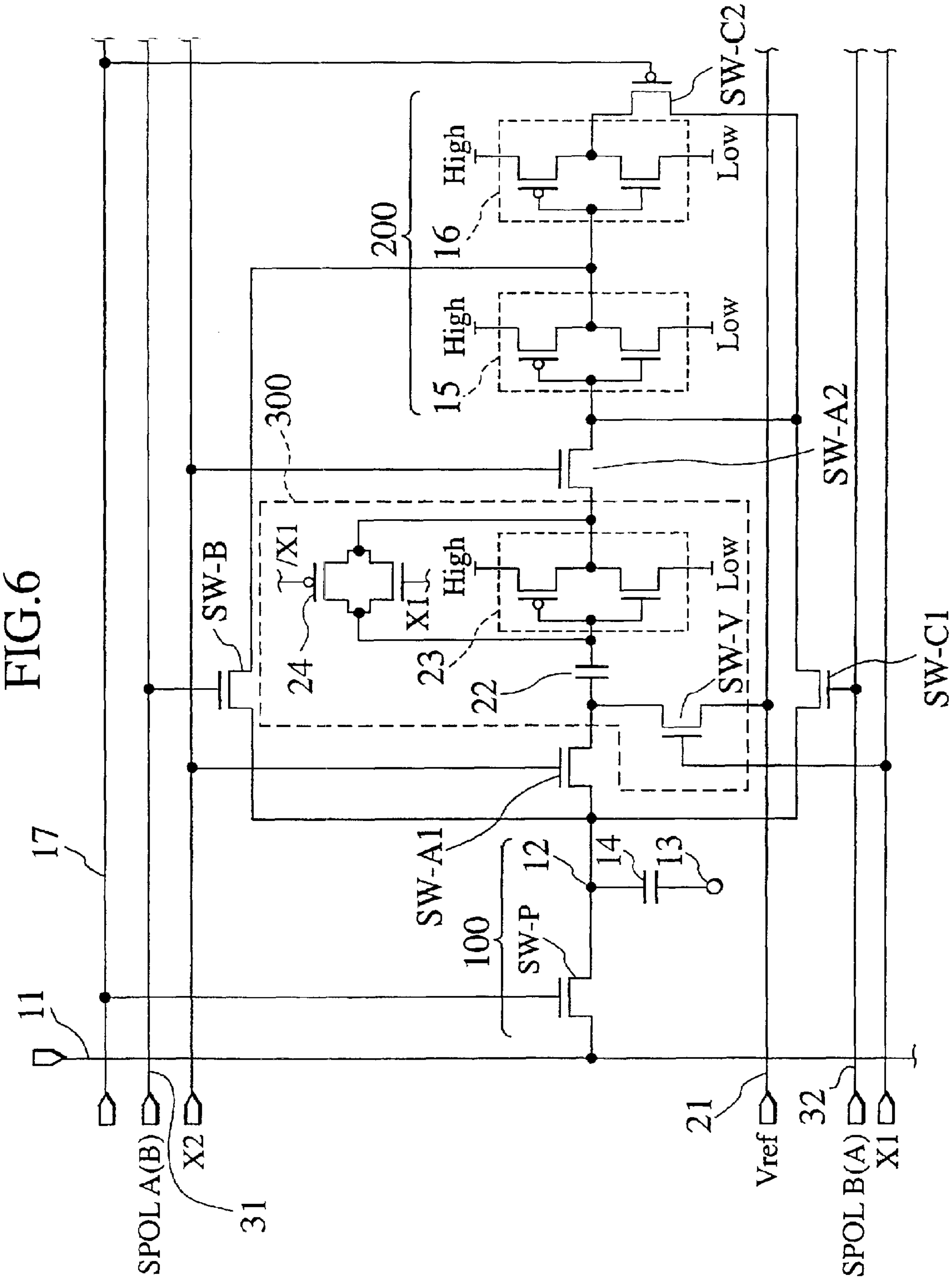
FIG. 6 is a view showing a circuitry in one pixel of a liquid crystal display device according to a second embodiment.

FIG. 6 shows a circuitry in one pixel of a liquid crystal display device according to the second embodiment. In FIG. 6, portions similar to those of FIG. 4 are denoted by similar reference numerals. In FIG. 6, each of the switch symbols and the inverter symbols of FIG. 4 is represented by a circuit symbol indicating a TFT.

According to the second embodiment, a binary data conversion unit 300 is interposed between the pixel portion 100 and the SRAM portion 200. Accordingly, control lines X1, X2, 31, and 32 and a reference voltage line 21 are provided.

The binary data conversion unit 300 is designed to convert video data represented by a tone level of the normal display area into binary data corresponding to a brightest white display or a darkest black display in the pixel portion 100. The binary data conversion unit 300 includes a capacitor 22, an inverter 23, a loop switch 24, and a switch SW-V.

The capacitor 22 is a voltage holding circuit to hold a voltage in accordance with a potential difference between input side and output side thereof, and to increase or decrease a voltage held in the output side in accordance with voltage variation occurring in the input side. In other words, the capacitor 22 operates to maintain a voltage ratio between the input side and the output side while holding a voltage in accordance with the potential difference between the input side and the output side. For example, when 2.5 V and 2.3 V are held in the input side and the output side of the capacitor 22, respectively, if the voltage of the input side changes to 2.7 V, the capacitor 22 operates to maintain a potential difference of 0.2 V, and thus the voltage becomes 2.5 V in the output side.

The inverter 23 is a binary data generation circuit to generate binary data corresponding to the darkest black display or the brightest white display in the pixel portion 100 in accordance with voltage variation in the input side of the capacitor 22, the voltage variation being caused by the video data represented by the tone level of the normal display area. The inverter 23 is composed of a CMOS circuit and receives high and low power supply voltages supplied from a not-shown power supply circuit. Each of these high and low power supply voltages takes a voltage value to make operable the inverter 15 of the SRAM portion 200. In other words, the inverter 23 outputs the high or low power supply voltage as binary data corresponding to the darkest black display or the brightest white display in the pixel portion 100. Similarly, high and low power supply voltages are supplied from a not-shown power supply circuit to the inverters 15 and 16 of the SRAM portion 200. Based on a potential difference between the high or low power supply voltage and the counter electrode voltage, brightest white display or darkest black display is carried out in the pixel portion 100.

The reference voltage Vref supplied to the reference voltage line 21 takes, for example an intermediate voltage value between the brightest white display and the darkest black display in the pixel portion 100.

The high and low power supply voltages supplied to the inverter 23 may not be equal to the high and low power supply voltage supplied to the inverters 15 and 16, respectively.

The loop switch 24 is a switching circuit to control electrical connection between the input side and the output side of the inverter 23. The electrical connection between the input side and the output side of the inverter 23 enables the output side of the capacitor 22 to be set at a threshold voltage Vth. The threshold value Vth is set to be approximately intermediate between the high and low power supply voltages of the inverter 23.

The switch SW-V is a reference voltage setting circuit to hold the reference voltage Vref supplied from the reference voltage line 21 in the input side of the capacitor 22. By connecting the switch SW-V, the reference voltage can be set in the input side of the capacitor 22.

The switch SW-V and the loop switch 24 are controlled to be turned on/off by a high or low control signal supplied to the control line X1. The switches SW-A1 and SW-A2 are simultaneously controlled to be turned on/off by a high or low control signal supplied to the control line X2. In a not-shown system control circuit, a low control signal is outputted to the control lines X1 and X2 at the time of normal display and, in one last frame before the normal display is changed to the static image display, high control signals (pulse signals) are individually supplied to the control lines X1 and X2 for each one horizontal scanning period.

The switches SW-B and SW-C1 are switching elements for taking out data to control electrical connection between the pixel portion 100 and the SRAM portion 200. The switch SW-B is controlled to be turned on/off by a high or low polarity reversal signal supplied to the control line 31. The switch SW-C1 is controlled to be turned on/off by a high or low polarity reversal signal supplied to the control line 32. In the not-shown system control circuit, high or low polarity reversal signals are outputted to the control lines 31 and 32 at the time of SRAM driving. However, the potential levels of the polarity reversal signals outputted to the control lines 31 and 32 are reverse to each other. Specifically, if a high polarity reversal signal is outputted to the control line 31, and a low polarity reversal signal is outputted to the control line 32 in a given frame, in a next frame, a low polarity reversal signal is outputted to the control line 31, and a high polarity reversal signal is outputted to the control line 32.

The switch SW-C2 is a data holding switching element to control electrical connection of the loop connection of the inverters 15 and 16. The switch SW-C2 is connected to the scanning line 17 shared by the switch SW-P, and controlled to be turned on/off simultaneously with the switch SW-P by a high or low scanning signal supplied to the scanning line 17. The turning on/off of the switch SW-C2 is reverse to that of the switch SW-P. Specifically, the switch SW-C2 is turned off when the switch SW-P is turned on, and the switch SW-C2 is turned on when the switch SW-P is turned off.

The control lines X1, X2, 31 and 32 shown in FIG. 6 are equivalent to the SRAM control line 17.

Next, description will be made for the operations of the pixel portion 100, the SRAM portion 200, and the binary data conversion unit 300 constructed in the foregoing manner. Also, in this second embodiment, as in the case of the first embodiment, the horizontal line reversal driving is carried out at the time of normal driving, and the frame reversal driving is carried out at the time of SRAM driving.

In the case of changing the operation from the normal driving to the SRAM driving, binary data is written in the SRAM portion 200 of each pixel by using the last frame before the normal driving is changed to the SRAM driving. In the horizontal line reversal driving, a polarity of a signal voltage varies for each horizontal line. Thus, pixel operations are different between binary data writing when the counter electrode voltage of each horizontal line is low and binary data writing when the counter electrode voltage is high.

Figure 7:
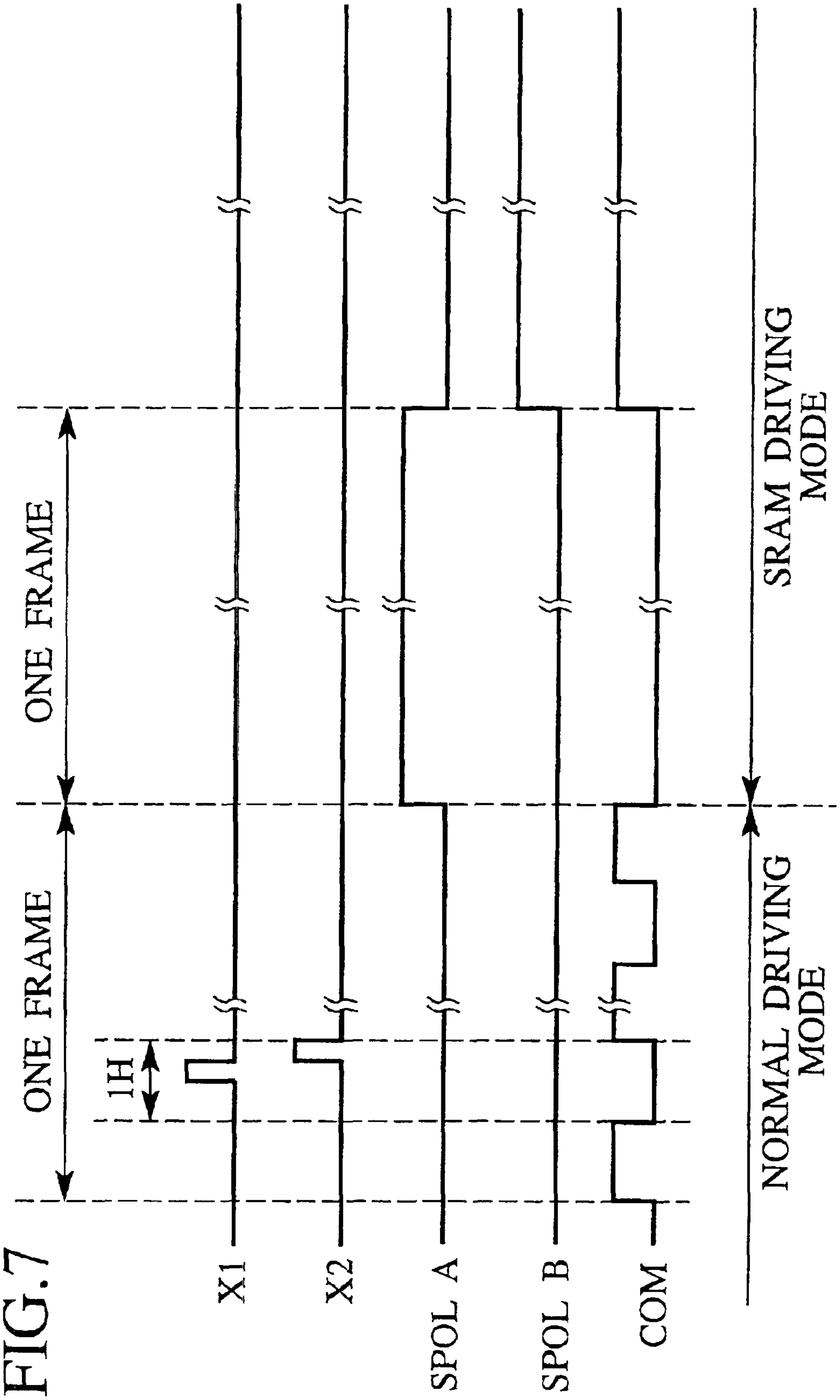
FIG. 7 is a time chart showing an operation of writing binary data when a counter electrode voltage is low.
Figure 8:
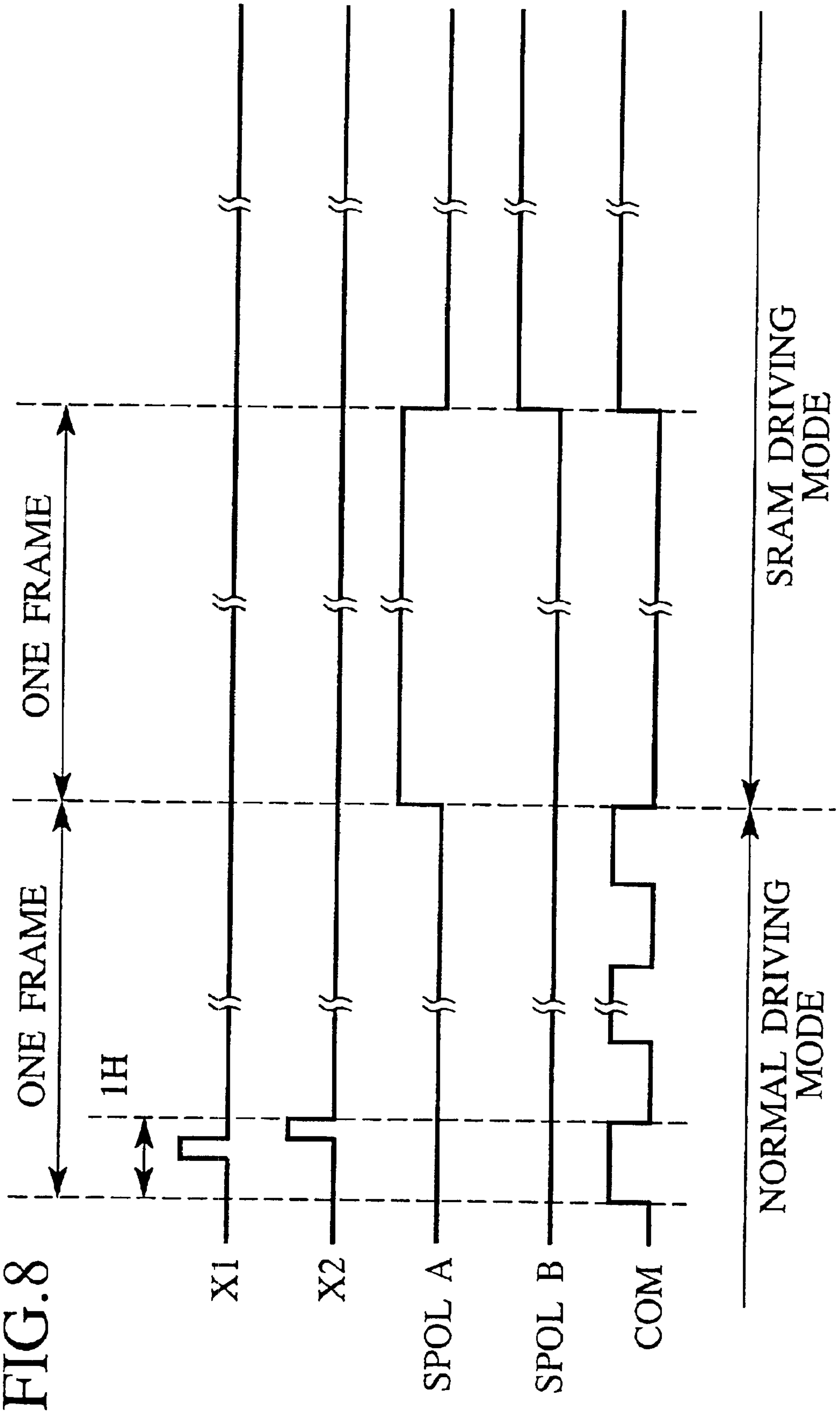
FIG. 8 is a time chart showing an operation of writing binary data when the counter electrode voltage is high.

Along with the above operation, input positions of the signal SPOLA and the signal SPOLB shown in FIG. 7 and FIG. 8 are also changed for each horizontal line. In other words, as shown in FIG. 7, in a pixel on the horizontal line, in which binary data is written when the counter electrode voltage is low, the SPOLA is supplied to the control line 31, and the SPOLB is supplied to the control line 32. As shown in FIG. 8, in a pixel on the horizontal line, in which binary data is written when the counter electrode voltage is high, the SPOLA is supplied to the control line 32, and the SPOLB is supplied to the control line 31. In FIG. 6, for easier understanding of the change of the input positions, representations of SPOLA(B) and SPOLB(A) are used. The bracketed portions indicate the SPOLA and the SPOLB in a case where binary data writing is carried out when the counter electrode voltage is high (FIG. 8).

FIG. 7 is a time chart showing the operation of writing binary data when the counter electrode voltage is low. FIG. 8 is a time chart showing the operation of writing binary data when the counter electrode voltage is high. Any of these drawings shows one last frame (binary data writing frame) of the normal driving mode and a frame of the SRAM driving mode.

The operation on the normal driving mode is substantially similar to that of the first embodiment. Specifically, the switches SW-B and SW-C1 are turned off to electrically disconnect the pixel portion 100 and the SRAM portion 200 from each other. Then, the switch SW-P is turned on at a predetermined cycle to apply video data supplied to the signal line 11 to the pixel electrode 12. On the normal driving mode, the switches SW-A1 and SW-A2 are both turned off.

In the last frame before the normal driving mode is changed into the SRAM driving mode, video data is inputted to a pixel on a horizontal line for each horizontal scanning period (1 H). First, description will be made for the pixel on a horizontal line, in which binary data is written when a counter electrode voltage (COM) is low, as shown in FIG. 7.

As shown in FIG. 7, when the control line X1 becomes high while the counter electrode voltage is low, the switch SW-V is turned on to hold a reference voltage Vref in the input side of the capacitor 22. Simultaneously, when the loop switch 24 is turned on to electrically connect the input side and the output side of the inverter 23 with each other, a potential substantially intermediate between the high and low power supply voltages of the inverter 23 is held as a threshold voltage Vth in the output side of the capacitor 22. Then, the capacitor 22 holds a voltage equivalent to a potential difference between the voltage (reference voltage Vref) of the input side of the capacitor 22 and the voltage (threshold voltage Vth) of the output side thereof. In the embodiment, since the high power supply voltage is 5 V, and the low power supply voltage is 0 V, for example, 2.3 V is held as the threshold voltage in the output side of the capacitor 22. Accordingly, if the reference voltage Vref is 2.5 V, 0.2 V is held in the capacitor 22 as a voltage corresponding to a potential difference between the input side and the output side of the capacitor 22. The inverter 23 is not operated at the threshold voltage. An n channel side of the inverter 23 is turned on when voltage variation in the input side of the capacitor 22 causes the voltage of the output side of the capacitor 22 to increase more than the threshold voltage, and a p channel side of the inverter 23 is turned on when the voltage of the output side of the capacitor 22 decreases below the threshold voltage.

After the foregoing voltage setting, even when the control line X1 becomes low, and the switch SW-V and the loop switch 24 are turned off, the threshold voltage is continuously held in the output side of the capacitor 22.

Subsequently, when the control line X2 becomes high, the switches SW-A1 and SW-A2 are turned on. Accordingly, the video data inputted from the signal line 11 through the switch SW-P is supplied to the capacitor 22. In this case, when voltage variation occurring in the input side of the capacitor 22 causes the voltage of the output side thereof to increase more than the threshold voltage, a high voltage is set in the input side of the inverter 23, and a low voltage is set in the output side of the inverter 23. This low voltage is inputted to the inverter 15 and held as binary data having different voltage levels in the inverters 15 and 16. On the other hand, when voltage variation occurring in the input side of the capacitor 22 causes the voltage of the output side thereof to decrease below the threshold voltage, a low voltage is set in the input side of the inverter 23, and a high voltage is set in the output side of the inverter 23. This high voltage is inputted to the inverter 15 and then held as binary data having different voltage levels in the inverters 15 and 16.

For example, when inputted video data is 2.7 V, 2.5 V is set in the output side of the capacitor 22 because the capacitor 22 maintains the potential difference of 0.2 V. In this case, since the voltage of the output side of the capacitor 22 increases more than the threshold voltage, the input side of the inverter 23 becomes high. When inputted video data is 2.3 V, 2.1 V is set in the output side of the capacitor 22. In this case, since the voltage of the output side of the capacitor 22 decreases below the threshold voltage, the input side of the inverter 23 becomes low.

Now, description will be made by way of an example, where black display is carried out by writing a voltage having a polarity reverse to the counter electrode voltage, and white display is carried out by writing a voltage having a polarity identical to the counter electrode voltage. That is, when the counter electrode voltage is low, black display is carried out with a high write voltage, and white display is carried out with a low write voltage. When the counter electrode voltage is high, black display is carried out with a low write voltage, and white display is carried out with a high write voltage.

Description will be made again of the operation when the control line X2 is high. When the control line X2 becomes high, in the pixel of black display, a signal voltage of the inputted video data increases the voltage of the output side of the capacitor 22 more than the threshold voltage. Accordingly, the high power supply voltage is held in the output side of the inverter 15, and a low power supply voltage is held in the output side of the inverter 16. On the other hand, in the pixel of white display, a signal voltage of the inputted video data decreases the voltage of the output side of the capacitor 22 below the threshold voltage. Accordingly, the low power supply voltage is held in the output side of the inverter 15, and the high power supply voltage is held in the output side of the inverter 16. Thus, in the binary data conversion unit 300, the signal voltage of the video data represented by the tone level of the normal display area is selected based on the reference voltage held in the input side of the capacitor 22 and the threshold voltage held in the output side of the capacitor 22, and then the video data is converted into binary data corresponding to the brightest white display or the darkest black display in the pixel portion 100.

Thereafter, the process transfers to the SRAM driving mode. In the frame reversal driving on the SRAM driving mode, a phase relation between the signal voltage of the binary data and the counter electrode voltage is changed alternately for each one frame. On the SRAM driving mode, the scanning line 17 is fixed to be low, and the switch SW-C2 is kept on. If the counter electrode voltage is low in one frame of the SRAM driving mode, a polarity thereof is identical to that of the counter electrode voltage when the video data was previously converted into the binary data. Thus, when the control line 31 becomes high and the switch SW-B is turned on, the voltage held in the output side of the inverter 15 is applied through the switch SW-B to the pixel electrode 12. For example, in the pixel of black display, since the high power supply voltage is applied to the pixel electrode from the output side of the inverter 15, the counter electrode and the pixel electrode are set at the low voltage and the high voltage, respectively, resulting in black display. In addition, in the pixel of white display, since a low power supply voltage is applied from the output side of the inverter 15, the counter electrode and the pixel electrode are set at the low voltage and the low voltage, respectively, resulting in a white display.

When the counter electrode voltage becomes high in a next frame, a polarity thereof is reversed from that of the counter electrode voltage when the video data was previously converted into the binary data. Accordingly, when the control line 32 becomes high and the switch SW-C1 is turned on, the voltage held in the output side of the inverter 16 is applied through the switches SW-C2 and SW-C1 to the pixel electrode 12. For example, in the pixel of black display, since the low power supply voltage is applied from the output side of the inverter 16, the counter electrode and the pixel electrode are set at the high voltage and the low voltage, respectively, resulting in black display. In the pixel of white display, since the high power supply voltage is applied from the output side of the inverter 16, the counter electrode and the pixel electrode are set at the high voltage and the high voltage, respectively, resulting in white display. Thus, even when a frame is changed and the polarity of the counter electrode voltage is reversed, black is displayed in the pixel of black display, and white is displayed in the pixel of white display, as in the case of the previous frame.

On the other hand, as shown in FIG. 8, in the case of the operation of writing binary data when the counter electrode voltage is high, voltages having polarities reverse to each other is held in the output sides of the inverters. In addition, in this case, the electrical connection of the SPOL connection line shown in FIG. 6 is one represented by a bracket portion.

That is, when the control line X2 becomes high, in the pixel of black display, the signal voltage of the inputted video data decreases the voltage of the output side of the capacitor 22 below the threshold voltage. Accordingly, the low power supply voltage is held in the output side of the inverter 15, and the high power supply voltage is held in the output side of the inverter 16. On the other hand, in the pixel of white display, the signal voltage of the inputted video data increases the voltage of the output side of the capacitor 22 more than the threshold voltage. Accordingly, the high power supply voltage is held in the output side of the inverter 15, and the low power supply voltage is held in the output side of the inverter 16.

Then, in one frame of the SRAM driving mode, if the counter electrode voltage is low, a polarity thereof is reversed from that when the video data was previously converted into binary data. Thus, when the control line 32 becomes high and the switch SW-C1 is turned on, the voltage held in the output side of the inverter 16 is applied through the switches SW-C2 and SW-C1 to the pixel electrode 12. For example, in the pixel of black display, since the high power supply voltage is applied from the output side of the inverter 16 to the pixel electrode, the counter electrode and the pixel electrode are set at the low voltage and the high voltage, respectively, resulting in black display. In the pixel of white display, since the low power supply voltage is applied from the output side of the inverter 16 to the pixel electrode, the counter electrode and the pixel electrode are set at the low voltage and the low voltage, respectively, resulting in white display.

When the counter electrode voltage becomes high in a next frame, a polarity thereof is identical to that of the counter electrode voltage when the video data was previously converted into the binary data. Accordingly, when the control line 31 becomes high and the switch SW-B is turned on, the voltage held in the output side of the inverter 15 is applied through the switches SW-B to the pixel electrode 12. For example, in the pixel of black display, since the low power supply voltage is applied from the output side of the inverter 15 to the pixel electrode, the counter electrode and the pixel electrode are set at the high voltage and the low voltage, respectively, resulting in black display. In the pixel of white display, since the high power supply voltage is applied from the output side of the inverter 15, the counter electrode and the pixel electrode are set at the high voltage and the high voltage, respectively, resulting in white display. Thus, even when a frame is changed and the polarity of the counter electrode voltage is reversed, black is displayed in the pixel of black display, and white is displayed in the pixel of white display, as in the case of the previous frame.

As described above, on the SRAM driving mode, by controlling the potentials of the control lines 31,32 in correspondence to the polarity of the counter electrode voltage, it is possible to hold the video data for the static image, which is written in the last frame before the normal driving mode is changed into the SRAM driving mode, during the SRAM driving mode.

According to the second embodiment, the reference voltage Vref is supplied to the input side of the capacitor 22, and the threshold voltage Vth is supplied to the output side of the capacitor 22, Vth taking a substantially intermediate potential between the high and low power supply voltages supplied to the binary data conversion unit 300, allowing the capacitor 22 to hold the potential difference therebetween. Thus, when the signal voltage of the inputted video data is higher than the reference voltage Vref, the voltage of the input side of the capacitor 22 is increased. Accordingly, the voltage of the output side of the capacitor 22 is increased more than the threshold voltage Vth, thus enabling the SRAM portion 200 to hold the signal voltage as black (or white) binary data. When the signal voltage of the inputted video data decreases the voltage of the output side below the threshold voltage Vth, the SRAM portion 200 can hold the signal voltage as white (or black) binary data. Since the increase/decrease in the voltage of the output side with respect to the threshold voltage Vth is associated with the increase/decrease in the voltage of the input side with respect to the reference voltage Vref, white or black can be decided based on the reference voltage. In the described embodiment, the black (or white) binary data can be written with a voltage higher than 2.5 V of the reference voltage Vref, and the white (or black) binary data can be written with a voltage lower than 2.5 V. Thus, since the intermediate voltage used for the normal driving enables the black and white binary data to be written, the SRAM driver for supplying 5 V or 0 V binary data using driving voltages different from those at the time of normal driving is made unnecessary. Therefore, the supplying of binary data to the SRAM portion 200 can also be carried out by the source driver, making it possible to omit not only the SRAM driver but also the SRAM writing line 2 of FIG. 1 and the switches 8 and 9 of FIG. 2. As a result, it is possible to reduce manufacturing costs, and enhance yield by greatly simplifying the constitution of the driver for driving the pixel portion 100 and the SRAM portion 200. Moreover, it is possible to achieve higher definition and a narrower frame by suppressing the increase in a circuit size. Especially, in the second embodiment, it is possible to write binary data in the SRAM portion 200 in an accurate and stable manner irrespective of variance among elements constituting the pixel.

In the foregoing embodiment, description has been made for the case of the present invention applied to the liquid crystal display device. However, it should be understood that the display layer as one of the components of the invention is not limited to the liquid crystal layer and can be substituted to another material layer. For example, a fluorescence emission layer can be used as the display layer. In such a case, the device of the present invention can be constructed as an organic electroluminescence (EL) panel.

The preferred embodiments of the present invention regarding the display device and the driving method have been described. However, the invention is not limited to the embodiments, and various changes and modifications can be made within the teachings of the invention. Moreover, the embodiments include the inventions of various stages, and various inventions can be extracted by properly combining the disclosed components. For example, the components can be extracted as the inventions as long as predetermined effects are obtained, even if some parts are removed from the disclosed components.

What is claimed is:

1. A display device comprising:

a display panel including a plurality of pixels, each of the pixels including: a pixel portion for executing display in accordance with a write voltage; and a data memory portion for converting a write voltage equivalent to any one of white and black represented by a tone level of a normal display area into a write voltage corresponding to any one of brightest white display and darkest black display in the pixel portion, and for holding the converted write voltage;

an array substrate having a pluralities of signal lines and scanning lines disposed in a matrix form; a pixel electrode formed for each lattice of the matrix form; a pixel switching element provided for each lattice to electrically connect each of the signal lines and the pixel electrode with each other by a scanning signal supplied to each of the scanning lines to write video data supplied to each of the signal lines into the pixel electrode; a data memory portion provided for each lattice to hold binary data to be written into the pixel electrode;

a counter substrate having a common counter electrode disposed oppositely to the pixel electrode with a predetermined gap interposed therebetween; and a display layer held between the array substrate and the counter substrate, and the data memory portion converts video data equivalent to any one of white and black represented by the tone level of the normal display area into binary data corresponding to any one of the brightest white display and the darkest black display in the pixel portion, and holds the binary data;

wherein normal display is carried out with the write voltage represented by the tone level of the normal display area, and static image display is carried out with the write voltage, which is held in the data memory portion and corresponds to any one of the brightest white display and the darkest black display in the pixel portion.

2. The display device according to claim 1, wherein the data memory portion includes:

two inverters connected in a loop form;

a data holding switching element for controlling electrical connection of the loop connection; and two data taking-out switching elements for controlling electrical connection between the pixel portion and the data memory portion.

3. A method for driving a display device, the display device being specified in claim 2, comprising:

in normal display, turning on the pixel switching element at a predetermined cycle; and writing video data supplied to each of the signal lines into the pixel electrode, and in static image display, converting video data equivalent to any one of white and black represented by the tone level of the normal display area, the video data being supplied to each of the signal lines, into binary data corresponding to any one of the brightest white display and the darkest black display in the pixel portion; holding the binary data in the data memory portion; alternately turning on the two data taking-out switching elements for each frame; taking out the binary data different in polarity for each frame from the data memory portion, and writing the binary data in the pixel electrode.

4. The method for driving a display device according to claim 3, wherein a potential of the counter electrode voltage is reversed in accordance with a cycle of writing the binary data different in polarity for each frame in the pixel electrode.

5. The method for driving a display device according to claim 3, wherein in the case of the normal display, horizontal line reversal driving is carried out to set a polarity of signal voltages written in the pixels on a horizontal line opposed to that of signal voltages written in the pixels on a horizontal line adjacent thereto, and to reverse the polarities of the signal voltages for each frame, and in the case of the static image display, frame reversal driving is carried out to reverse polarities of signal voltages written in all the pixels for each frame.

6. The display device according to claim 1, wherein the display layer is a liquid crystal layer.

7. A display device comprising:

a display panel including a plurality of pixels, each of the pixels including: a pixel portion for executing display in accordance with a tone level of a write voltage; a data conversion unit for selecting a write voltage equivalent to any one of white and black represented by a tone level of a normal display area based on a threshold voltage, and converting the selected write voltage into a write voltage corresponding to any one of a brightest white display and a darkest black display in the pixel portion; and a data memory portion for holding the write voltage converted by the data conversion unit, wherein normal display is carried out with the write voltage represented by the tone level of the normal display area, and static image display is carried out with the write voltage, which is held in the data memory portion and corresponds to any one of the brightest white display and the darkest black display in the pixel portion.

8. The display device according to claim 7, wherein said display panel includes:

an array substrate having a pluralities of signal lines and scanning lines disposed in a matrix form; a pixel electrode formed for each lattice of the matrix form; a pixel switching element provided for each lattice to electrically connect each of the signal lines and the pixel electrode with each other by a scanning signal supplied to each of the scanning lines to write video data supplied to each of the signal lines into the pixel electrode; a data memory portion provided for each lattice to hold binary data to be written into the pixel electrode; a data conversion unit for selecting video data represented by the tone level of the normal display area based on a threshold voltage and for converting the selected video data into binary data corresponding to any one of the brightest white display and the darkest black display in the pixel portion;

a counter substrate having a common counter electrode disposed oppositely to the pixel electrode with a predetermined gap interposed therebetween; and a display layer held between the array substrate and the counter substrate.

9. The display device according to claim 8, wherein the data conversion unit includes: a voltage holding circuit for holding a voltage in accordance with a potential difference between input side and output side and for increasing or decreasing a voltage held in the output side in accordance with voltage variation occurring in the input side; a binary data generation circuit for generating binary data corresponding to any one of the brightest white display and the darkest black display in the pixel portion in accordance with reference voltage variation caused in the input side of the voltage holding circuit by the video data represented by the tone level of the normal display area; a switching circuit for controlling electrical connection between the input side and the output side of the binary data generation circuit; and a reference voltage setting circuit for holding a reference voltage in the input side of the voltage holding circuit, and the data memory portion includes two inverters connected in a loop form, a data holding switching element for controlling electrical connection of the loop connection, and two data taking-out switching elements for controlling electrical connection between the pixel portion and the data memory portion.

10. The display device according to claim 9, wherein the data conversion unit is disposed between the pixel portion and the data memory portion.

11. The display device according to claim 9, wherein the binary data generation circuit includes a CMOS circuit, selects voltage variation occurring in the input side of the voltage holding circuit based on increase or decrease in a voltage of the output side of the voltage holding circuit with respect to the threshold voltage, and outputs one of high and low power supply voltages supplied as power supply voltages for the CMOS circuit as binary data corresponding to any one of a brightest white display and a darkest black display in the pixel portion.

12. The display device according to claim 11, wherein the output side of the voltage holding circuit holds a threshold voltage for operating the binary data generation circuit, a low power supply voltage is outputted from the binary data generation circuit as binary data corresponding to any one of the brightest white display and the darkest black display in the pixel portion when voltage variation occurring in the input side of the voltage holding circuit increases a voltage of the output side of the voltage holding circuit more than the threshold voltage, and a high power supply voltage is outputted from the binary data generation circuit as binary data corresponding to any one of the darkest black display and the brightest white display in the pixel portion when voltage variation occurring in the input side of the voltage holding circuit decreases a voltage of the output side of the voltage holding circuit below the threshold voltage.

13. The display device according to claim 9, wherein the output side of the voltage holding circuit holds a voltage, which is substantially intermediate between the high and low power supply voltages supplied as power supply voltages for the CMOS circuit, as a threshold voltage for the CMOS circuit, and the threshold voltage is set by using the switching circuit to electrically connect the input side and the output side of the binary data generation circuit with each other.

14. The display device according to claim 7, wherein the display layer is a liquid crystal layer.

15. A method for driving a display device, the display device being specified in claim 7, comprising:

in normal display, turning on the pixel switching element at a predetermined cycle; and writing video data supplied to each of the signal lines in the pixel electrode, and in static image display, converting video data represented by the tone level of the normal display area, the video data being supplied to each of the signal lines, into binary data corresponding to any one of the brightest white display and the darkest black display in the pixel portion at the data conversion unit, holding the binary data in the data memory portion; alternately turning on the two data taking-out switching elements for each frame to take out binary data different in polarity for each frame from the data memory portion; and writing the binary data into the pixel electrode.

16. The method for driving a display device according to claim 15, wherein in the case of the static image display, in a frame where a potential of the counter electrode voltage has a polarity identical to that of a potential of the counter electrode voltage when binary data is held in the data memory portion, one of the two data taking-out switching elements is turned on to take out the binary data from one inverter of the data memory portion, and in a frame where a potential of the counter electrode voltage has a polarity reverse to that of a potential of the counter electrode voltage when binary data is held in the data memory portion, the other of the two data taking-out switching elements is turned on to take out the binary data from the other inverter of the data memory portion.

17. The method for driving a display device according to claim 15, wherein in the case of the normal display, horizontal line reversal driving is carried out to set a polarity of signal voltages written in the pixels on a horizontal line opposed to that of signal voltages written in the pixels on a horizontal line adjacent thereto and to reverse the polarities of the signal voltages for each frame, and in the case of the static image display, frame reversal driving is carried out to reverse polarities of signal voltages written in all the pixels for each frame.

* * * * *

UNITED STATES PATENT AND TRADEMARK OFFICE

CERTIFICATE OF CORRECTION

PATENT NO. : 6,876,348 B2
DATED : April 5, 2005
INVENTOR(S) : Murata et al.

It is certified that error appears in the above-identified patent and that said Letters Patent is hereby corrected as shown below:

Title page,
Item [75], Inventors, should read:
-- [75] Inventors: Hiroyoshi Murata, Saitama-ken (JP);
Nobuo Yamasaki, Saitama-ken (JP);
Masakatsu Kitani, Saitama-ken (JP);
Yoshiro Aoki, Saitama-ken (JP) --

Signed and Sealed this

Seventh Day of June, 2005

JON W. DUDAS
*Director of the United States Patent and Trademark Office*